United States Patent
Liao

(10) Patent No.: US 9,032,902 B2
(45) Date of Patent: May 19, 2015

(54) MANUFACTURING APPARATUS FOR ACTIVATED CARBON FILTERS

(71) Applicant: I-Chung Liao, Taichung (TW)

(72) Inventor: I-Chung Liao, Taichung (TW)

(*) Notice: Subject to any disclaimer, the term of this patent is extended or adjusted under 35 U.S.C. 154(b) by 81 days.

(21) Appl. No.: 13/892,405

(22) Filed: May 13, 2013

(65) Prior Publication Data

US 2014/0335212 A1  Nov. 13, 2014

(51) Int. Cl.
*B05C 19/00* (2006.01)
*B05C 13/00* (2006.01)
*B29C 43/00* (2006.01)

(52) U.S. Cl.
CPC .................................. *B29C 43/006* (2013.01)

(58) Field of Classification Search
CPC .............. B29C 43/006; B05C 19/00
USPC .............. 118/308, 325, 58, 59, 60, 100, 101; 131/342, 343; 29/820; 427/180, 194, 427/213.31, 213.32; 425/115
See application file for complete search history.

(56) References Cited

U.S. PATENT DOCUMENTS 2,772,181 A * 11/1956 Rogers et al. ................. 427/194
3,017,309 A * 1/1962 Crawford et al. ............. 156/161

* cited by examiner

*Primary Examiner* — Yewebdar Tadesse
(74) *Attorney, Agent, or Firm* — Rosenberg, Klein & Lee

(57) ABSTRACT

A manufacturing apparatus for activated carbon filters has a non-woven cloth machine, a rolling module, a sprayer and a hot-pressing cylinder. The non-woven cloth machine is used to manufacture a body of non-woven cloth and has a processing segment. The rolling module is mounted at the processing segment to heat and melt the body of non-woven cloth. The sprayer is mounted above the rolling module to spray activated carbon powder on the body of non-woven cloth. The hot-pressing cylinder is mounted at the processing segment to heat and press the activated carbon powder with the body of non-woven cloth. The activated carbon powder can be securely attached to the body of non-woven cloth by the manufacturing apparatus to provide a preferred quality of the activated carbon filters and to reduce the cost of manufacturing the activated carbon filters.

2 Claims, 7 Drawing Sheets

MANUFACTURING APPARATUS FOR ACTIVATED CARBON FILTERS

BACKGROUND OF THE INVENTION

1. Field of the Invention

The present invention relates to a manufacturing apparatus for filters, and more particularly to a manufacturing apparatus for activated carbon filters that can provide a preferred quality of the activated carbon filters and can reduce the cost of manufacturing the activated carbon filters.

2. Description of Related Art

With reference to FIG. 7, a conventional manufacturing method for activated carbon filters includes a preparing step, a soaking step, drying step and a winding step. The preparing step comprises preparing a body of non-woven cloth by a non-woven cloth machine. The body of non-woven cloth has multiple pores. The soaking step comprises soaking the body of non-woven cloth in an activated carbon aqueous solution that is a mixture of activated carbon powder and water to enable the activated carbon powder to attach to the pores of the body of non-woven cloth. The drying step comprises drying the body of non-woven cloth after soaking to form an activated carbon non-woven cloth. The winding step comprises winding the activated carbon non-woven cloth to form an activated carbon filter.

However, the conventional manufacturing method for activated carbon filters has the following shortcomings that affect the filtering effect of the activated carbon filters.

1. The activated carbon powder that is used in the soaking step of the conventional manufacturing method for activated carbon filters is naturally attached to the pores of the body of non-woven cloth without exertion of any external pressing force. The amount of the activated carbon powder that is attached to the pores of the body of non-woven cloth is limited and this will affect the filtering effect of the activated carbon filters.

2. The activated carbon powder is not uniformly distributed in the water, and cannot be attached to the body of non-woven cloth with a uniform distribution in the soaking step of the conventional manufacturing method for activated carbon filters, and this will affect the filtering effect of the activated carbon filters.

3. As the activated carbon powder is naturally attached to the pores of the body of non-woven cloth without exertion of any external pressing force, the activated carbon powder may fly out and detach from the pores of the body of non-woven cloth during the drying process, and this will cause air pollution.

4. A machine apparatus that is used in the drying step for drying the body of non-woven cloth may consume a lot of energy and this will increase the cost of manufacturing the activated carbon filters.

In addition, another conventional manufacturing method for activated carbon filters includes preparing plastic particles and activated carbon powder, heating and melting the plastic particles and the activated carbon powder to form the activated carbon filters. However, the surface area of the activated carbon powder is mostly covered by the plastic particles, such that the surface area of the activated carbon powder in contact with the water is small, even as small as less than one-third of the whole surface area of the activated carbon powder. As such, the filtering effect of the activated carbon filters is poor yet with a high consumption of materials, and this will increase the cost of manufacturing the activated carbon filters.

To overcome the shortcomings, the present invention provides a manufacturing apparatus for activated carbon filters to mitigate or obviate the aforementioned problems.

SUMMARY OF THE INVENTION

The main objective of the present invention is to provide a manufacturing apparatus for activated carbon filters that can provide a preferred quality of the activated carbon filters and can reduce the cost of manufacturing the activated carbon filters.

The manufacturing apparatus for activated carbon filters in accordance with the present invention has a non-woven cloth machine, a rolling module, a sprayer and a hot-pressing cylinder. The non-woven cloth machine is used to manufacture a body of non-woven cloth and has a processing segment. The rolling module is mounted at the processing segment to heat and melt the body of non-woven cloth. The sprayer is mounted above the rolling module to spray activated carbon powder on the body of non-woven cloth. The hot-pressing cylinder is mounted at the processing segment to heat and press the activated carbon powder with the body of non-woven cloth. The activated carbon powder can be securely attached to the body of non-woven cloth by the manufacturing apparatus in accordance with the present invention to provide a preferred quality of the activated carbon filters and to reduce the cost of manufacturing the activated carbon filters.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
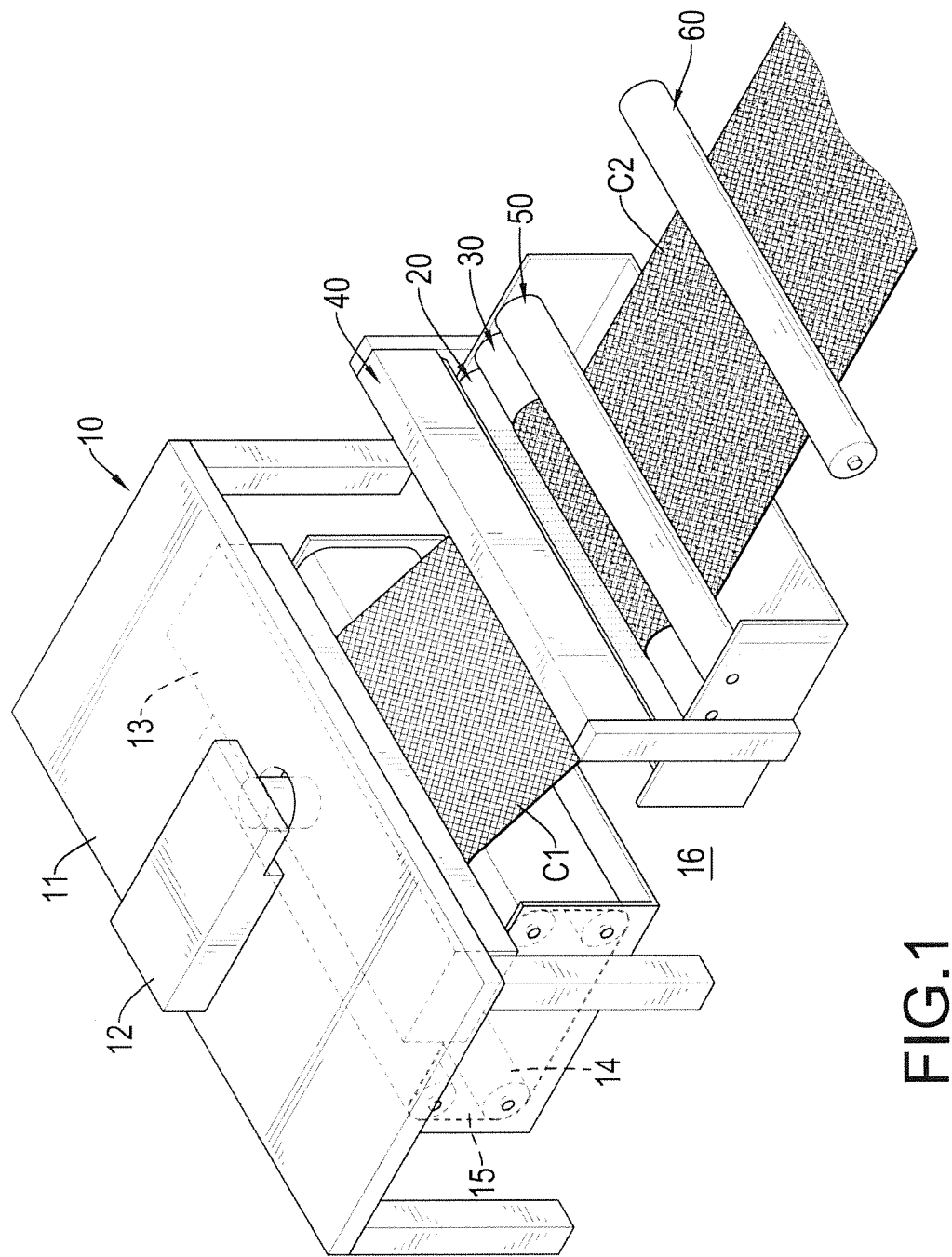
FIG. 1 is a perspective view of a manufacturing apparatus for activated carbon filters in accordance with the present invention.
Figure 2:
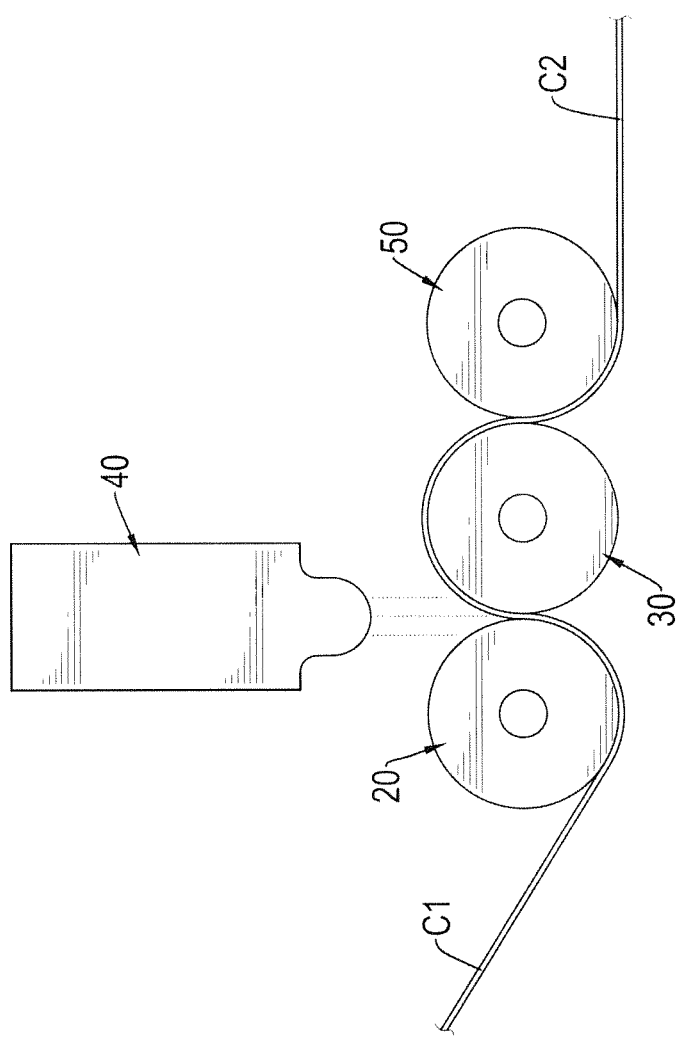
FIG. 2 is an enlarged side view of cylinders of the manufacturing apparatus for activated carbon filters in FIG. 1.

With reference to FIGS. 1 and 2, a manufacturing apparatus for activated carbon filters in accordance with the present invention comprises a non-woven cloth machine 10, a rolling module, a sprayer 40, a hot-pressing cylinder 50 and a winding cylinder 60.

The non-woven cloth machine 10 is used to manufacture a body of non-woven cloth C1 and has a main frame 11, an extrusion device 12, a sprinkler nozzle 13, multiple transporting cylinders 14, a conveyor belt 15 and a processing segment 16. The main frame 11 may be a rectangular frame and has a top, a bottom, a middle and a front side. The extrusion device 12 is securely mounted on the top of the main frame 11. The sprinkler nozzle 13 is mounted in the main frame 11 at the middle of the main frame 11 and is connected to the extrusion device 12. The transporting cylinders 14 are rotatably and transversally mounted on the bottom of the main frame 11 at intervals. The conveyor belt 15 is mounted around the transporting cylinders 14 below the sprinkler nozzle 13 and is driven by the transporting cylinders 14 to move relative to the sprinkler nozzle 13. The processing segment 16 is defined at the front side of the main frame 11. The non-woven cloth machine 10 is conventional and the features and the structures of the non-woven cloth machine 10 are not described in detail.

The rolling module is rotatably mounted at the processing segment 16 of the non-woven cloth machine 10, is used to heat and melt the body of non-woven cloth C1 and has a preheating cylinder 20 and a heating cylinder 30. The preheating cylinder 20 is rotatably and transversally mounted at the processing segment 16 of the non-woven cloth machine 10 and is used to heat the body of non-woven cloth C1. The heating cylinder 30 is rotatably and transversally mounted at the processing segment 16 of the non-woven cloth machine 10 adjacent to the preheating cylinder 20 and is used to heat the body of non-woven cloth C1. In addition, the preheating cylinder 20 is mounted at the processing segment 16 between the body of non-woven cloth C1 and the heating cylinder 30.

The sprayer 40 is mounted at the processing segment 16 of the non-woven cloth machine 10 above the preheating cylinder 20 and the heating cylinder 30 to spray activated carbon powder B on the body of non-woven cloth C1.

The hot-pressing cylinder 50 is rotatably mounted at the processing segment 16 of the non-woven cloth machine 10 adjacent to the rolling module and is used to press the body of non-woven cloth C1 after the activated carbon powder B is sprayed on the body of non-woven cloth C1 by the sprayer 40. Preferably, the heating cylinder 30 is mounted at the processing segment 16 between the preheating cylinder 20 and the hot-pressing cylinder 50. In addition, the preheating cylinder 20, the heating cylinder 30 and the hot-pressing cylinder 50 are sequentially mounted at the processing segment 16 at the same horizontal height.

The winding cylinder 60 is rotatably and transversally mounted at the processing segment 16 of the non-woven cloth machine 10 such that the hot-pressing cylinder 50 is mounted between the non-woven cloth machine 10 and the winding cylinder 60.

Figure 3:
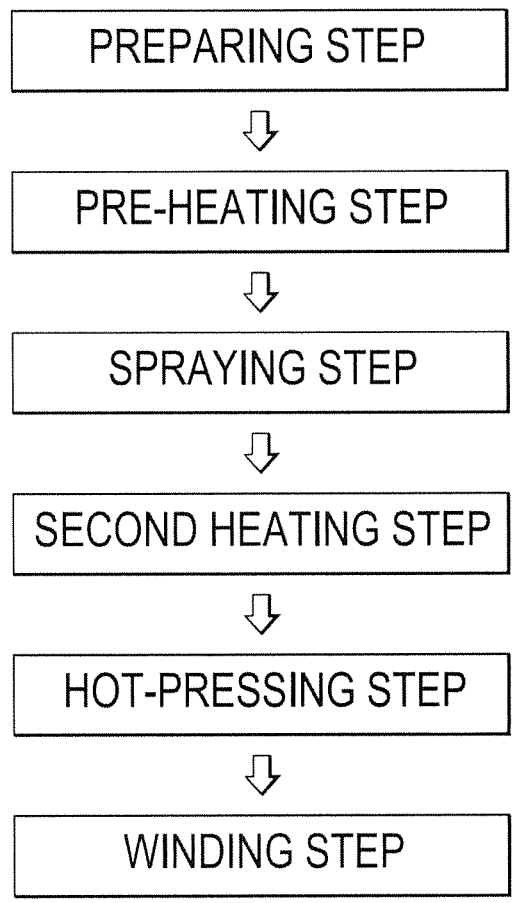
FIG. 3 is a block diagram of a method of manufacturing activated carbon filters by the manufacturing apparatus in FIG. 1.

With reference to FIGS. 1 to 3, according to the above-mentioned features and structural relationship of the manufacturing apparatus, when the manufacturing apparatus is used to manufacture the activated carbon filters C3, the manufacturing process includes a preparing step, a preheating step, a spraying step, a second heating step, a hot-pressing step and a winding step.

The preparing step comprises manufacturing a body of non-woven cloth C1 by the non-woven cloth machine 10. The preheating step comprises preheating and melting the body of non-woven cloth C1 by the preheating cylinder 20. The spraying step comprises spraying the activated carbon powder B on the body of non-woven cloth by the sprayer 40 after the preheating step C1.

The second heating step comprises heating and melting the body of non-woven cloth C1 with the activated carbon powder B by the heating cylinder 30. In addition, when the body of non-woven cloth C1 is moved between the preheating cylinder 20 and the heating cylinder 30 by the transporting cylinders 14 and the conveyor belt 15, the body of non-woven cloth C1 is pressed on a lower half of the preheating cylinder 20 and an upper half of the heating cylinder 30 as shown in FIG. 2.

The hot-pressing step comprises heating and pressing the body of non-woven cloth C1 after the second heating step to melt and press the activated carbon powder B on the body of non-woven cloth C1 to form an activated carbon non-woven cloth C2. In addition, in the hot-pressing step, the activated carbon non-woven cloth C2 is pressed on a lower half of the hot-pressing cylinder 50 as shown in FIG. 2. Preferably, the temperatures of the preheating cylinder 20, the heating cylinder 30 and the hot-pressing cylinder 50 are increased sequentially, and the temperature of the preheating cylinder 20 is higher than 100 degrees Celsius and the temperature of the hot-pressing cylinder 50 is lower than 160 degrees Celsius.

Figure 4:
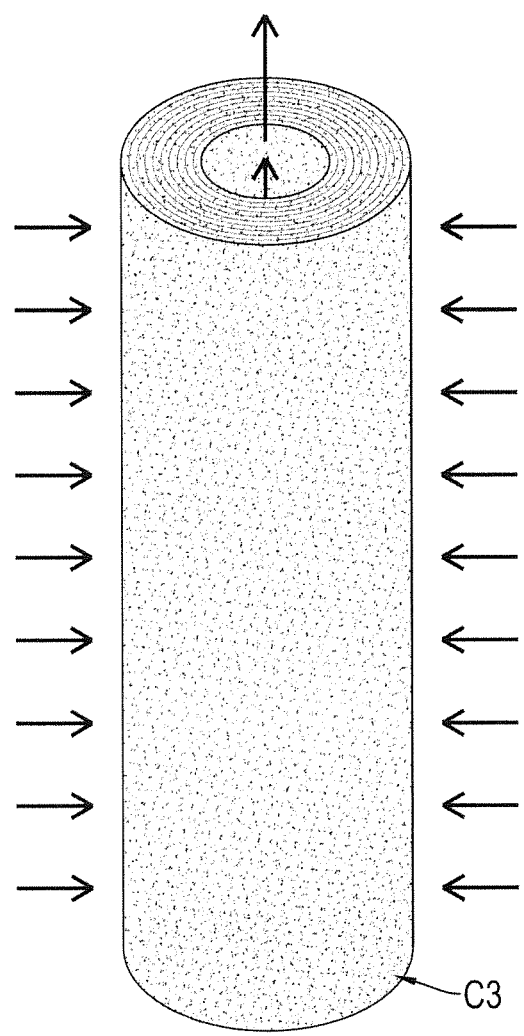
FIG. 4 is an operational perspective view of an activated carbon filter that is manufactured by the manufacturing apparatus in FIG. 1.

The winding step comprises winding the activated carbon non-woven cloth C2 after the hot-pressing step to form an activated carbon filter C3 as shown in FIG. 4. Furthermore, the temperature of the hot-pressing cylinder 50 can be controlled between 100 and 160 degrees Celsius to directly heat and press the body of non-woven cloth C1 with the activated carbon powder B without using the preheating cylinder 20 and the heating cylinder 30 of the rolling module.

Figure 5:
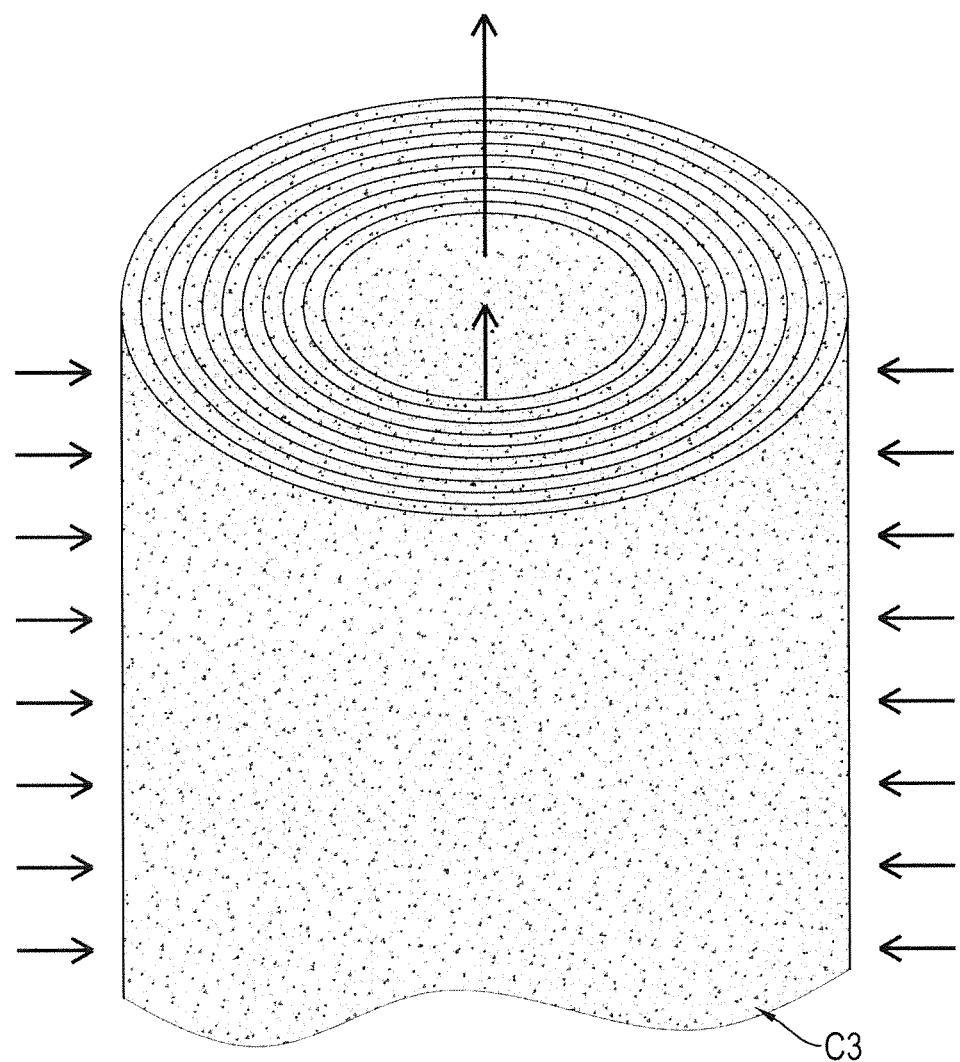
FIG. 5 is an enlarged and operational perspective view of the activated carbon filter in FIG. 4.
Figure 6:
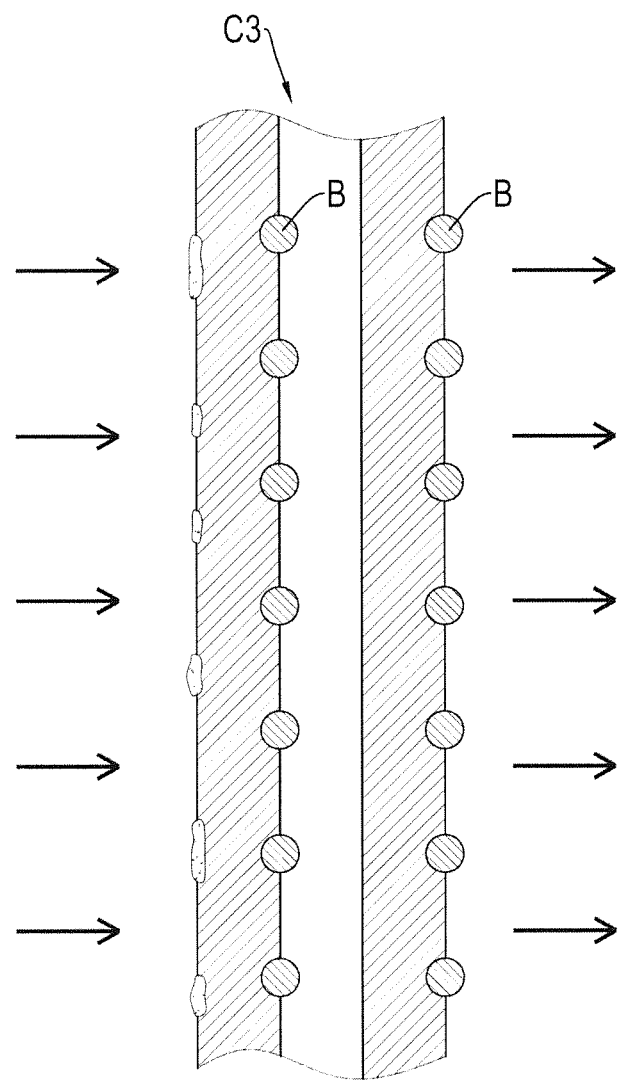
FIG. 6 is an enlarged side view of the activated carbon filter in FIG. 4.
Figure 7:
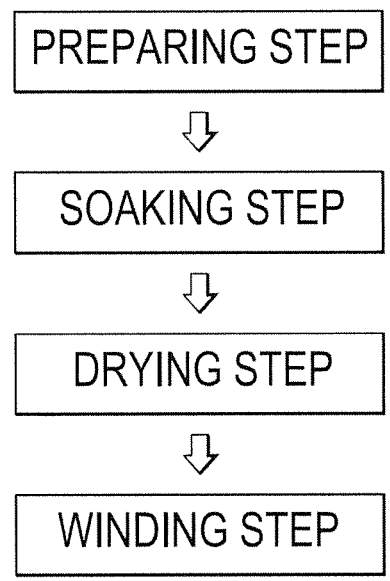
FIG. 7 is a block diagram of a method of manufacturing activated carbon filters in accordance with the prior art.

With reference to FIGS. 4 to 6, when the activated carbon filter C3 that is manufactured by the manufacturing apparatus of the present invention is in use, the water flows into the activated carbon filter C3 from an external surface to an internal surface of the activated carbon filter C3, the impurities in water are removed by the fibers of the body of non-woven cloth C1 and the water can be deodorized by the activated carbon powder B. In addition, the activated carbon powder B can also be used to adsorb finer impurities. Then, the manufacturing apparatus in accordance with the present invention can provide a preferred quality of the activated carbon filters C3.

The manufacturing apparatus for activated carbon filters C3 in accordance with the present invention has the following advantages.

1. As the body of non-woven cloth C1 is heated and melted by the rolling module, the activated carbon powder B can be attached to the body of non-woven cloth C1 by the sprayer 40 in uniform distribution, and the activated carbon powder B can be securely attached to the body of non-woven cloth C1 by the hot-pressing cylinder 50. Accordingly, the amount of the activated carbon powder B of the activated carbon filter manufactured by the manufacturing apparatus of the present invention is more than the amount of the activated carbon powder attached to the pores of the body of non-woven cloth of the activated carbon filter manufactured by the conventional manufacturing apparatus. In addition, the distribution uniformity of the activated carbon powder B on the body of non-woven cloth C1 is better than that of the activated carbon powder of the activated carbon filter manufactured by the conventional manufacturing apparatus. As such, the activated carbon filter that is manufactured by the manufacturing apparatus in accordance with the present invention has a preferred filtering effect, and the manufacturing cost can be reduced.

2. The manufacturing apparatus in accordance with the present invention can be used to manufacture activated carbon filters without using a drying device to avoid consuming a lot of energy, and this can reduce the cost of manufacturing the activated carbon filters.

3. The sprayer 40 of the manufacturing apparatus in accordance with the present invention can be used to control the distribution of the activated carbon powder B, and the activated carbon powder B will not be pressed to be covered by the plastic particles, thereby avoiding reduction of the surface area of the activated carbon powder B for filtering impurities and absorbing odor of water.

4. As the activated carbon powder B is attached to the body of non-woven cloth C1 by heating and pressing, the activated carbon powder B will not fly out and detach from the body of non-woven cloth C1, and this can avoid causing air pollution.

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing apparatus for activated carbon filters, the manufacturing apparatus having:

a non-woven cloth machine manufacturing a body of non-woven cloth and having a processing segment;

a rolling module mounted at the processing segment of the non-woven cloth machine to heat and melt the body of non-woven cloth; wherein the rolling module has a preheating cylinder and a heating cylinder, the preheating cylinder rotatably and transversally mounted at the processing segment of the non-woven cloth machine, and the heating cylinder rotatably and transversally mounted at the processing segment of the non-woven cloth machine adjacent to the preheating cylinder;

a sprayer mounted at the processing segment of the non-woven cloth machine above the rolling module to spray activated carbon powder on the body of non-woven cloth; and a hot-pressing cylinder rotatably mounted at the processing segment of the non-woven cloth machine adjacent to the rolling module to heat and press the body of non-woven cloth with the activated carbon powder after the activated carbon powder is sprayed on the body of non-woven cloth by the sprayer;

wherein the preheating cylinder, the heating cylinder and the hot-pressing cylinder are sequentially mounted at the processing segment of the non-woven cloth machine at the same horizontal height.

2. The manufacturing apparatus for activated carbon filters as claimed in claim 1, wherein the manufacturing apparatus has a winding cylinder rotatably and transversally mounted at the processing segment of the non-woven cloth machine such that the hot-pressing cylinder is mounted between the non-woven cloth machine and the winding cylinder.

* * * * *